United States Patent
Padfield

(10) Patent No.: US 10,062,173 B1
(45) Date of Patent: Aug. 28, 2018

(54) COMPOSITE IMAGE DETECTION

(71) Applicant: Amazon Technologies, Inc., Seattle, WA (US)

(72) Inventor: Dirk Ryan Padfield, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 14/964,252

(22) Filed: Dec. 9, 2015

(51) Int. Cl.

| G06T 7/10 | (2017.01) |
|---|---|
| G06T 7/00 | (2017.01) |
| G06K 9/48 | (2006.01) |
| G06K 9/46 | (2006.01) |
| G06T 5/50 | (2006.01) |
| G06Q 30/06 | (2012.01) |

(52) U.S. Cl.
CPC .......... *G06T 7/0083* (2013.01); *G06K 9/4604* (2013.01); *G06K 9/481* (2013.01); *G06Q 30/0643* (2013.01); *G06T 5/50* (2013.01); *G06T 7/0051* (2013.01); *G06T 7/0085* (2013.01); *G06T 2207/10024* (2013.01); *G06T 2207/20224* (2013.01)

(58) Field of Classification Search
None
See application file for complete search history.

(56) References Cited

U.S. PATENT DOCUMENTS

| 6,128,003 | A | * | 10/2000 | Smith | ................ G06K 9/00355 |
|---|---|---|---|---|---|
| | | | | | 345/156 |
| 7,472,077 | B2 | | 12/2008 | Roseman et al. | |
| 7,685,074 | B2 | | 3/2010 | Linden et al. | |
| 8,122,020 | B1 | | 2/2012 | Donsbach et al. | |
| 2010/0172567 | A1 | | 7/2010 | Prokoski | |
| 2011/0034176 | A1 | * | 2/2011 | Lord | .................. G06F 17/30244 |
| | | | | | 455/450 |
| 2011/0143811 | A1 | | 6/2011 | Rodriguez | |
| 2012/0065944 | A1 | | 3/2012 | Nielsen | |
| 2012/0294477 | A1 | * | 11/2012 | Yang | ..................... G06K 9/4671 |
| | | | | | 382/103 |
| 2014/0080428 | A1 | | 3/2014 | Rhoads | |
| 2016/0140146 | A1 | * | 5/2016 | Wexler | .............. G06F 17/30253 |
| | | | | | 707/741 |

\* cited by examiner

*Primary Examiner* — Bernard Krasnic
(74) *Attorney, Agent, or Firm* — Knobbe Martens Olson & Bear LLP

(57) ABSTRACT

Features are disclosed for processing composite images. Composite images may be received that include a common item such as a t-shirt with different graphics overlaid on the item. Features for detecting such composite images by comparing shape and color features of an uploaded image to previously detected composite images are described. Composite images including the common item may be grouped into clusters. The clustered images can then be processed as a group such as to separate the graphics from the underlying image and to make authorization determinations for inclusion in an online catalog system.

20 Claims, 13 Drawing Sheets

FIG. 11C
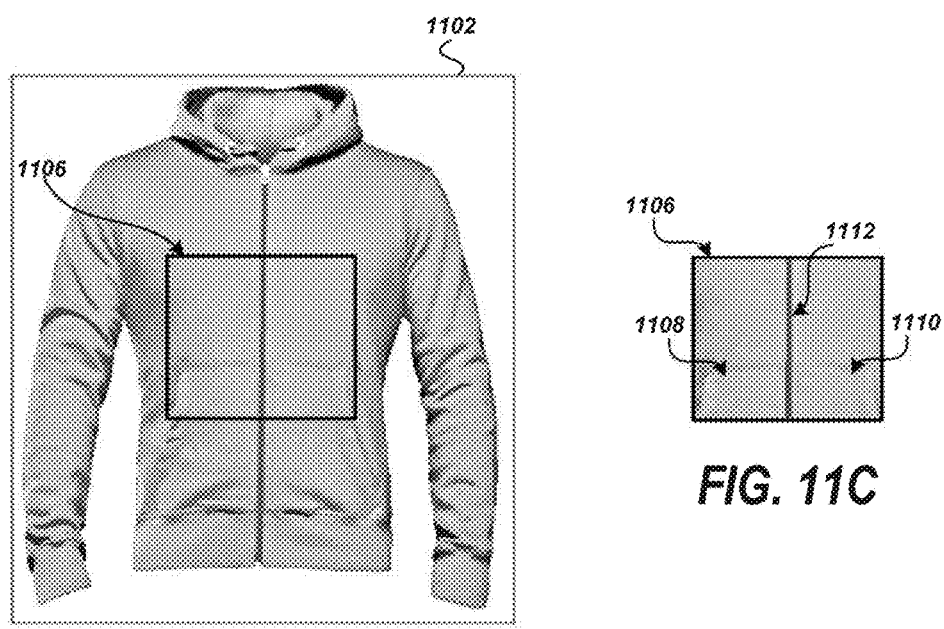
FIG. 11A
FIG. 11B

COMPOSITE IMAGE DETECTION

BACKGROUND

Composite images are images that have been combined or modified to digitally overlay two or more separate images. Take, for example, images of t-shirts or sweatshirts where the underlying image of a blank shirt may be overlaid with a variety of text, graphics, or images to create a number of composite images of the shirt in various permutations. This may be done to rapidly generate a large number of images representing various permutations of the shirt without requiring that a different image of each permutation of the shirt be photographed. Using a single underlying image, any number of composite images can be generated by overlaying other images, graphics, and/or text on the single image. In some instances, the subject of either or both of the images may not actually exist or have been manufactured, as it is a digital representation of the subjects themselves.

Creating a composite image can lead to unnatural patterns in the image such as graphics overlaying zippers, shirt folds, or creases; the graphic having straight lines that should be curves; unnatural blending of colors, etc. Some composite images may include, an underlying image of an otherwise unoffensive item (e.g., a blank t-shirt or mug) overlaid with prurient content or improper text. It may be desirable to avoid including such composite images of items in an electronic catalog or other data repository. Thus, composite images of items, if not created and processed carefully, may inaccurately represent the actual three-dimensional item the composite image is intended to represent and lead to inefficient processing of inaccurate or unnecessary images in resource (e.g., memory, power, bandwidth) constrained environments.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 11A depicts another example composite image formed from an underlying image and an overlaid image.

FIG. 11B depicts an region of the underlying image of FIG. 11A identified for quality analysis.

FIG. 11C depicts features included in the region of the underlying image that contribute to the quality metric analysis.

DETAILED DESCRIPTION

Although composite images may look unnatural at the edge where the overlaid image stops and the subject (e.g., t-shirt, cup, belt-buckle) of the underlying image is visible, it can be challenging to detect composite images, or to differentiate good quality composite images from poor ones, using an automated classification approach. Furthermore, specific classifiers for detecting things like zippers and clothing folds, and detecting whether a graphic is overlapping a zipper or fold may be error prone and fragile. Thus, methods and systems are described for detecting composite images by attempting to separate input images into three components: a background image, an underlying image depicting the item, and an overlaid image depicting a graphic or text. Using the underlying image and the overlaid image, the described systems and methods can specifically analyze the underlying image and/or the overlaid image, independently and as part of the composite image, to measure the quality of the composite image, the underlying image, or the overlaid image. In some implementations, an automated algorithm to detect and cluster such composite images may provide more reliable composite image detection than a manual approach because the automated algorithm can more accurately correlate pixel data from the overlaid image and the underlying image, and can draw from a long history of underlying and composite images in a data store so that, e.g., an underlying image from the data store can be matched to a new overlaid image.

Figure 7:
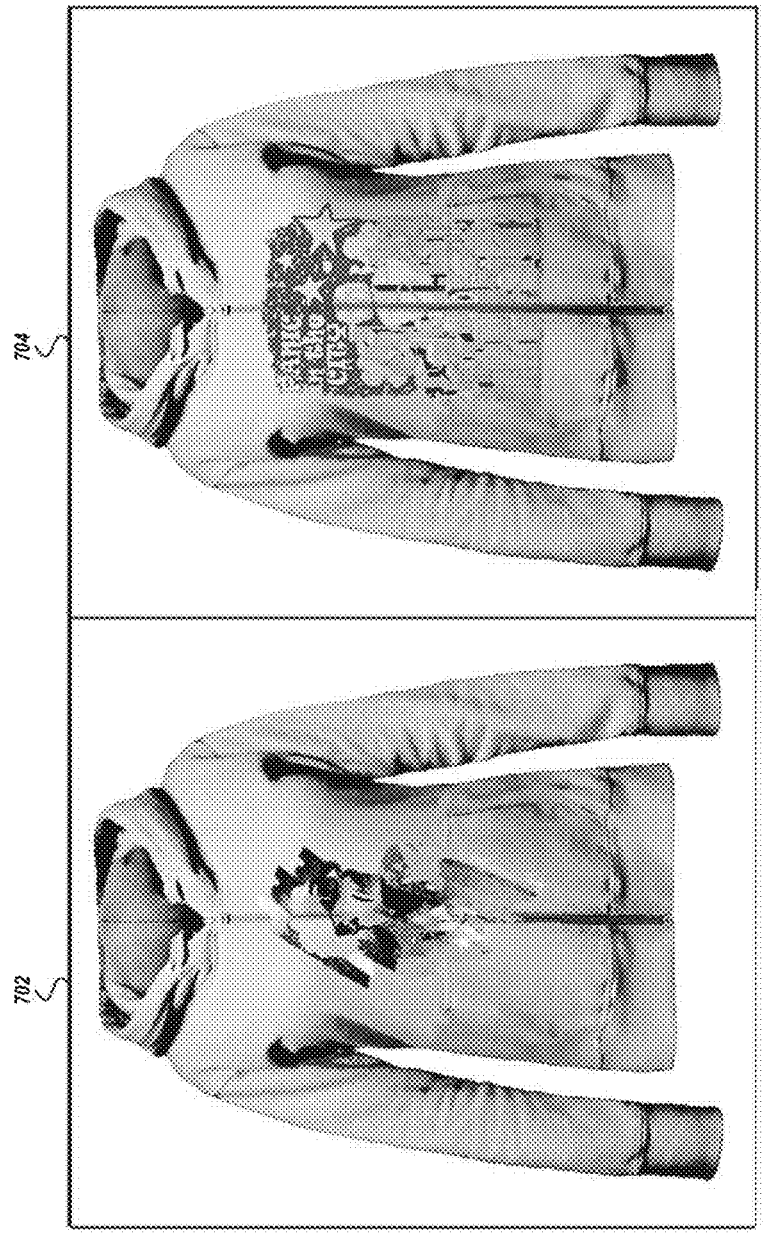
FIG. 7 depicts two example composite images having the same underlying image.

In this application, the term "cluster" is used to identify a group of composite images that have the same underlying image, but different overlaid images. For example, there may be three composite images in a cluster. Each composite image may include an underlying image of a blue hat, but in the first composite image an overlaid image of a frog is superimposed on the underlying image of the blue hat. In the second composite image, an overlaid image of a duck is superimposed on the underlying image of the blue hat. In the third composite image a raccoon is superimposed on the underlying image of the blue hat. FIG. 7, which described in further detail below, shows two composite images belonging to another example cluster. For purposes of this application, the term "overlaid image" may refer to any image, graphic, text, symbol etc. that is overlaid or superimposed on an underlying image to form a composite image.

The methods and systems described herein may be used to detect a composite image and extract the overlaid image from the composite image. For example, the shape and color of subjects in input images may be detected. The input images that include subjects having the same shape and color may be grouped to form a cluster. The mere clustering of these input images together indicates that they are, in fact, composite images and these input images should be treated as composite images. To allow real-time assessment of input images in an efficient fashion, rather than storing all the image data for each member of the cluster for composite image detection, the shape and/or color information for the cluster may be stored in a compact representation in a data store that enables fast and space-efficient indexing and searching.

Once individual clusters are identified, composite images within a cluster can be combined to reconstruct the "complete" background image (e.g., the image of a plain t-shirt without any overlay). Examples of reconstructed background images are shown in the first row of FIG. 8 which is described in further detail below. Using further image analysis techniques described herein, this "complete" background image can be used to extract the overlaid image from the composite image. Examples of extracted overlaid images are shown in the second row of FIG. 8 which is described in further detail below. Thus, the two images (i.e., the underlying image and the overlaid image) that were originally composed to create the composite image can be separated and analyzed separately to detect things like prurient content and improper text.

Figure 1:
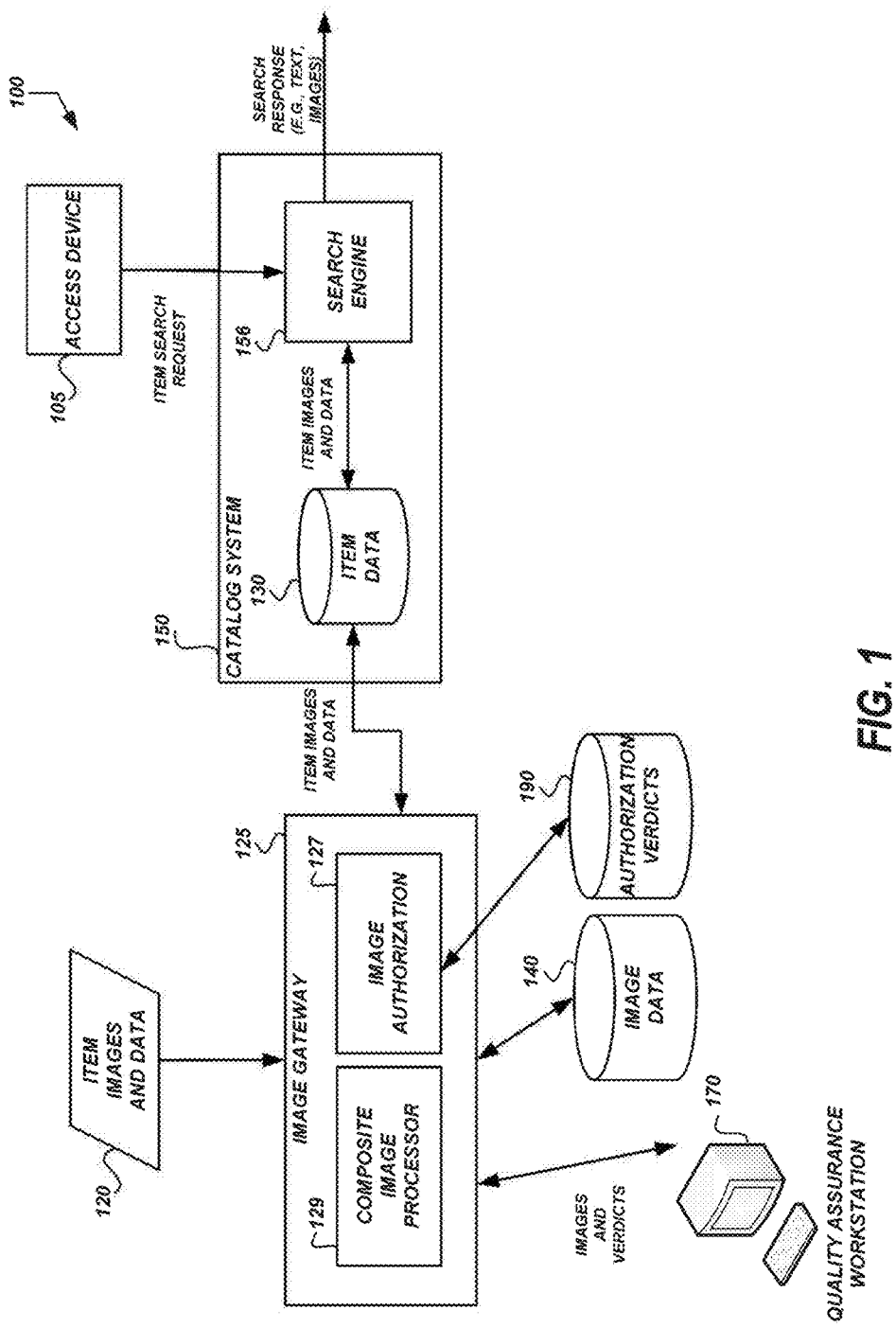
FIG. 1 is a block diagram showing an example of a catalog system for receiving and authorizing composite images.

FIG. 1 is a block diagram showing an example of a catalog system for receiving and authorizing composite images. The system 100 includes a catalog system 150. The catalog system 150 may be included to provide a central repository of items that can be accessed by user. The catalog system 150 may provide functionality for users to, e.g., interactively browse, search for, review, rate, tag, purchase, sell and obtain recommendations of catalog items such as appliances, electronics, books, clothing, jewelry, and the like. Examples of such systems are described in greater detail, e.g., in U.S. Pat. Nos. 7,685,074; 7,472,077; and 8,122,020, each of which is incorporated herein by reference in its entirety.

The catalog system 150 may be organized to allow certain users to add or update item entries in the catalog system 150. Such modifications affect which items have information (e.g., description, color, different images) that is eligible to be presented by the catalog system 150. In the catalog system 150, it may be desirable to authorize item information prior to becoming accessible. Because the catalog system 150 may be publicly available, authorization of the items provided by the catalog may help improve a user's experience as she accesses the system 100. For example, the catalog system 150 may include a collection of information about items offered for sale via the Internet. The catalog system 150 may be accessed by users of all ages. As such, it may be desirable to avoid presenting item information about t-shirts with offensive slogans or images printed thereon. In some implementations, the users initiating transfer of information about an item may transmit the item information from a remote device for loading into the catalog system 150. Once loaded and authorized, a user may search the catalog system 150 to obtain the item data from the item data store 130.

As shown, an access device 105 may transmit an item search request to a catalog system 150. The access device 105 may be an electronic communication device configured to transmit machine readable messages to the catalog system 150. Non-limiting examples of the access device 105 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, FTP, or the like. The transmission may be sent wired, wireless, or hybrid wired-wireless networks.

The item search request may include text input such as a search query term. In other embodiments, the item search request may include audio data representing an utterance from a user. A search engine 156 included in the catalog system 150 may receive the item search request. The search engine 156 may be configured to search for items included in an item data store 130 using the item search request information. For example, if the item search request includes audio data, the search engine 156 may be configured to obtain a transcription of the audio from an automatic speech recognition system. Using the transcription or, in the case where the search query term is provided in textual form in the item search request, the search engine 156 may identify items in the item data store 130. The identification may be a literal identification (e.g., exact match between item data and the item search request). The identification may be a partial match (e.g., words with similar stems or synonyms matching). In some implementations, the search may be executed against an index of the item data store 130.

As items are identified, the information about the items may also be retrieved from the item data store 130. The information about an item may include one or more images for the item. The images may include one or more of composite images, non-composite images, background images, underlying images, or other depiction of the item that shows features of the item to a user browsing the catalog system. The information about the items identified may be provided by the search engine 156 as a search result. The search result, in some implementations, may be transmitted back to the access device 105. In some implementations, the search result may be forwarded to another system. For example, if the item search request included an action in conjunction with the search (e.g., "play movie Ishtar"), if the movie was found, playback may be initiated as part of the search result from the search engine 156 by transmitting a message to a media player. Accordingly, items can be searched and accessed from an item catalog stored in the item data store 130 via the catalog system 150.

To facilitate the loading of item data into the catalog system 150, an image gateway 125 may be included in the system 100. The image gateway 125 may be implemented using a computing device including a processor configured to execute instructions that cause the image gateway 125 to perform one or more of the functions described. For example, the image gateway 125 may provide a graphical user interface including transfer control element to receive input images and data 120 for an item from an external device. The input images and data 120 may be transferred as a batch or individually from external devices of entities wishing to include items in the catalog system 150. One or more of the input images transferred via the image gateway 125 may, upon analysis using the methods and devices described, be identified as composite images.

Figure 2A:
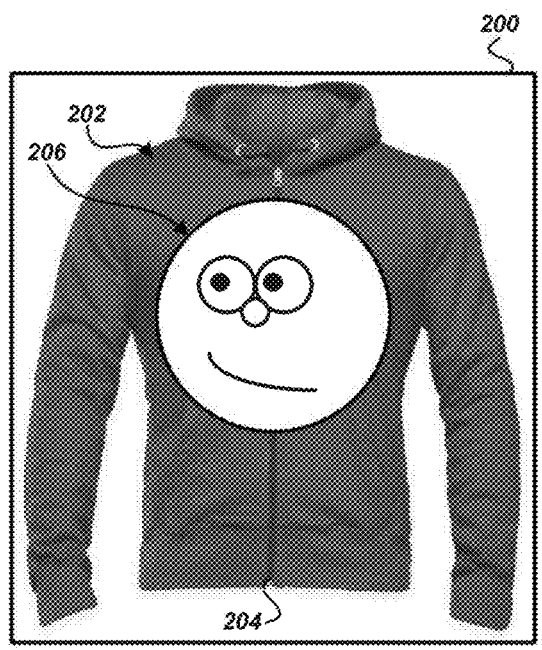
FIG. 2A depicts an example composite image formed from an underlying image and an overlaid image.

FIG. 2A depicts an example composite image formed from an underlying image and an overlaid image. The composite image 200 shows an item 202 with a graphic 206.

The item 202 shown in FIG. 2A is a sweatshirt. In some composite images, the graphic 206 partially or totally hides a feature of the item 202. As shown in FIG. 2A, the graphic 206 is covering part of a zipper 204 and part of the lines of the pockets.

Figure 2B:
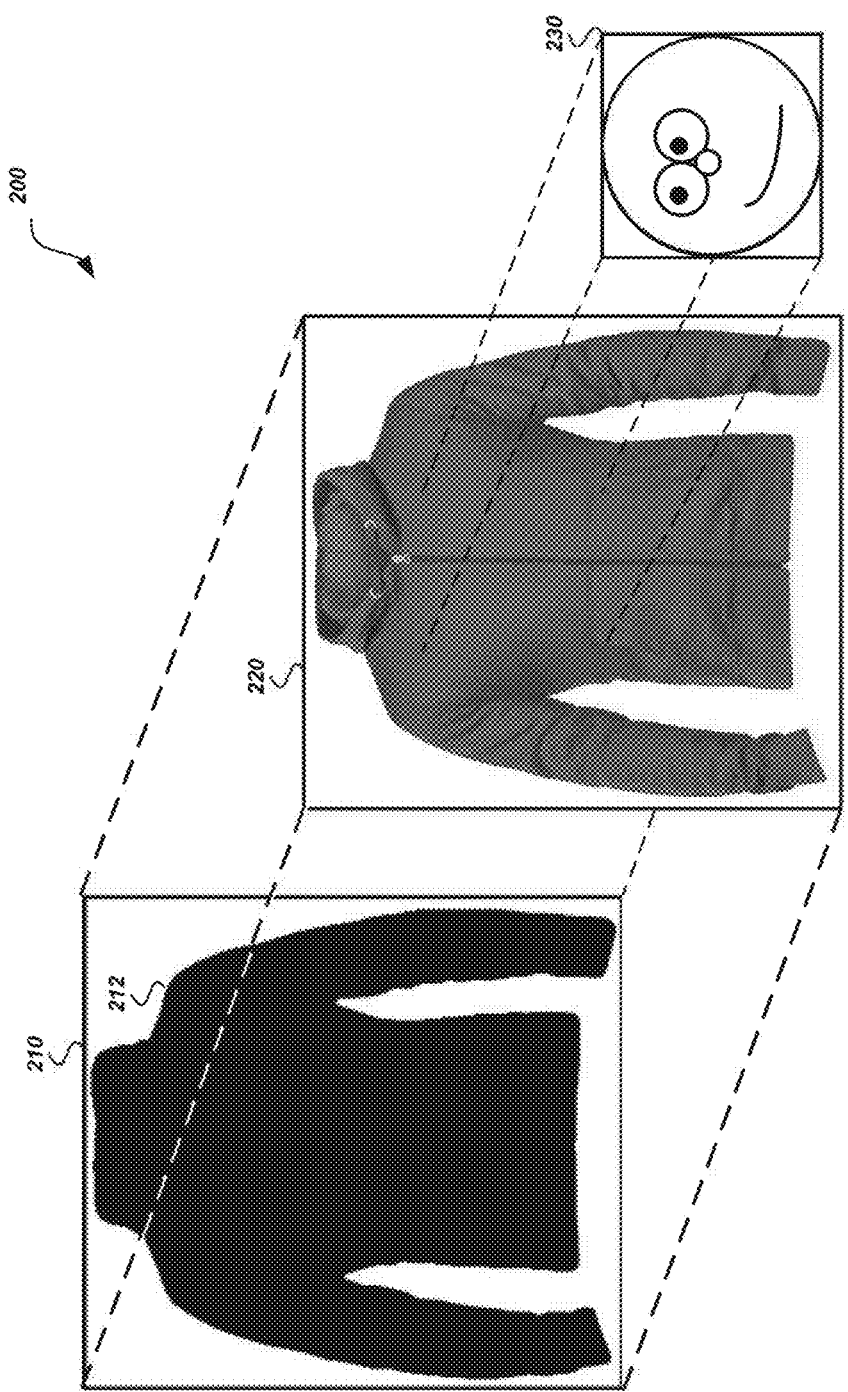
FIG. 2B depicts the example composite image of FIG. 2A separated into the underlying image and the overlaid image.

FIG. 2B depicts the example composite image of FIG. 2A separated into the underlying image and the overlaid image. The composite image 200 may be formed from a background image 210, an underlying image 220, and an overlaid image 230. Once combined into a single composite image, the respective images may be referred to as regions within with composite image (e.g., background image region, underlying image region, overlaid image region).

The background image 210 may form a mask 212 for pixels representing the item shown in the underlying image 202. The underlying image 220 shows the item 202 and the overlaid image 230 includes the graphic 206. When transferred to the system 100, the composite image 200 is single image including the elements shown in FIG. 2B. Using the methods and devices described, a composite image 200 may be processed to generate image files including each of the components of the composite image. For example, the background image 210 may be removed from the composite image 200 to generate a segmented image that includes pixel information for the underlying image 220 and the overlaid image 230. As another example, the underlying image 220 may be separated from the background image 210 and the overlaid image 230. As yet another example, the overlaid image 230 may be extracted from the composite image 200.

An image authorization module 127 may be included to determine whether the item images 120 are appropriate for the catalog system 150. The authorization may include confirming the identity of an entity involved in the transfer (e.g., user). This may be accomplished by receiving authentication information for the entity such as a username, password, authorization token, biometrics, or other credential.

If the entity is authorized, the content being transferred may then be subjected to authorization. For example, input image size and quality may be assessed to ensure the input images can be properly presented via the catalog system 150 to ensure a consistent look and feel when displayed. An input image may be assessed to confirm that the input image does not violate copyrights (e.g., the input image is identical to a protected image) and that it does not contain prurient content or inappropriate text.

The assessment may include providing input image data to a machine learning model to generate an assessment for an image. In some implementations, the input image may not be easily processed through artificial intelligence. In these cases, the image authorization 127 may transmit the input image to a quality assurance workstation 170. The quality assurance workstation 170 may queue images for manual review. The quality assurance workstation 170 may present an image for review and receive an authorization verdict for the image. As is described further below, when input images are provided to the quality assurance workstation 170, typically the verdict for a composite image included in a cluster of composite images may be applicable to all images in the cluster. As clusters may include hundreds or thousands of composite images, it may be desirable to allow the verdict for one image in the cluster to apply for all other composite images within the cluster.

In one experiment, over two million images were sampled over non-consecutive days, over five months. TABLE 1 below provides quantitative results on over 1.2 million composite images showing that approximately 40% of all images transferred to a catalog system were composite images. This highlights the scale of image processing, and improvements thereto, which can be achieved by providing specific solutions for this class of images.

TABLE 1

| Date | Percent Composite Image Transfers | Number of Composite Images Transferred | Percent Composite Images Accepted | Number of Images in Largest Cluster Accepted | Percent of Images Accepted from Largest Cluster |
|---|---|---|---|---|---|
| Day 1 | 54.10% | 111,558 | 93.37% | 14,097 | 99.91% |
| Day 2 | 45.92% | 75,303 | 97.23% | 13,179 | 99.99% |
| Day 3 | 64.73% | 346,064 | 19.99% | 6,753 | 7.21% |
| Day 4 | 49.87% | 186,499 | 7.18% | 24,942 | 1.66% |
| Day 5 | 27.71% | 182,633 | 3.73% | 167,045 | 0.00% |
| Day 6 | 14.01% | 14,809 | 25.72% | 139 | 1.44% |
| Day 7 | 53.59% | 11,359 | 0.75% | 0 | 0.00% |
| Day 8 | 42.99% | 129,518 | 2.88% | 104,148 | 0.00% |
| Day 9 | 24.71% | 20,462 | 39.12% | 3,940 | 12.97% |
| Day 10 | 46.34% | 115,120 | 3.07% | 13,623 | 0.76% |
| Day 11 | 18.57% | 19,787 | 54.04% | 1 | 0.00% |
| Total | 39.88% | 1,213,112 | 24.45% | | |

TABLE 1 also shows the percentage of composite images manually accepted (e.g., via a quality assurance workstation) each day. Cluster-by-cluster analysis of this example demonstrates that the manual verdicts within a composite image cluster (e.g., a group of images that have the same background but different graphics overlaid) agree, on average, with a rate of 97%. This means that individual clusters are either mostly accepted or mostly rejected—if some images in a first cluster were rejected, it is likely that the rest of the images in the first cluster will be rejected as well; and if some images in a second cluster were accepted, it is likely that the rest of the images in the second cluster will be too. For example, the last two columns of TABLE 1 show that, for the largest clusters of each day, the agreement is generally very high as indicated by the accept percentage (when the accept percentage is very low, it indicates that most of the images were rejected). In one instance, a composite image cluster had over 167 thousand images, and 100% of them were rejected. Accordingly, a few manual quality assurance verdicts may be obtained as a sample for these clusters. The manual verdicts may then be applied to all of the composite images included in the respective cluster.

In the case of composite images, because a composite image may include two or more components, it may be desirable to authorize the composite image in total and authorize each component. A composite image processor 129 may be included in the image gateway 125. The composite image processor 129 may be included in the transfer and/or authorization processing for an input image. The composite image processor 129 may be configured to identify composite images and assess composite images as described in further detail herein.

As the composite image processor 129 identifies and generates the separate image (e.g., background image, underlying image, overlaid image) included in a composite image, the image data for the separate images may be stored in an image data store 140. The image data store 140 may be a specially configured data store for maintaining image data.

For example, one approach is to store, in the image data store 140, each composite image and an identifier for the composite image. This can be resource intensive because every composite image would be stored, which can result in large a data store as the number of composite images transferred to the system increases. In some systems, on average, roughly 200,000 input images may be received daily. Storing the identifiers for these images may require roughly 0.15 KB per image, resulting in a data store size of approximately 30 MB per day, 210 MB per week, and 900 MB per month. Such a solution may prove to be unmanageable if identifiers generated over multiple months are accumulated in the same data store.

Another storage management solution is only to store one sample of each composite image. If a new input image correlates with a composite image already existing in the image data store 140, a composite image code may be returned and the new input image may not be added to the image data store 140. Storing only one image may hinder further processing of composite images and input images, such as during graphic extraction, but where extraction is not desired, this can be a resource efficient configuration.

Another storage management solution is to include a time stamp for each composite image and to remove the oldest composite image/images as new composite images are identified and added. This solution takes advantage of the fact that composite images may arrive at the system at or near the same time since composite images may be transferred together in a batch. However, this storage solution may fail to detect composite images that enter the system at distant time intervals (e.g., over one month) as the prior composite images may be removed from the system 100. This solution may also be slow since it may require periodic indexing of the image data store 140 as composite images are added and removed from the image data store 140.

One adaptation to this solution is to use one data store per period of time (e.g., week or month) and then clear the image data store 140 for the next period. Since the image data store 140 may be indexed on the name of the composite image file, this storage solution does not avoid duplicate composite images with different names. On the contrary, such duplicates may be added to the image data store 140. If desired, some implementations may avoid duplication by computing an image hash of the composite image and storing that as well. However, in some implementations, computing an image hash (in addition to the other processing) may be inefficient because every image uploaded to the system and search for duplicates requires a hash operation instead of a simple lookup. If an implementation does not require image hashing, the storage solution may rely on the assumption that there are few duplicates that have different file names relative to the total number of composite images in a cluster. As such, the detection of composite images and further composite image processing (e.g., extraction) may be minimally impacted.

Whether generated via the quality assurance workstation 170 or via the image authorization module 127, the verdicts for a given image transferred to the system 100 may be stored in an authorization verdicts data store 190. Where the given image is a composite image, the verdicts may be stored in association with the composite image or a cluster to which the composite image belongs. This allows a verdict for one composite image in the cluster to be applied for all composite images within the cluster.

If a composite image receives a positive authorization verdict, the composite image may be transmitted to the catalog system 150. As shown in FIG. 1, the image data (e.g., composite image, background image, overlaid image, underlying image) and item data may be stored in the item data storage 130 where they can be searched as described above.

Figure 3:
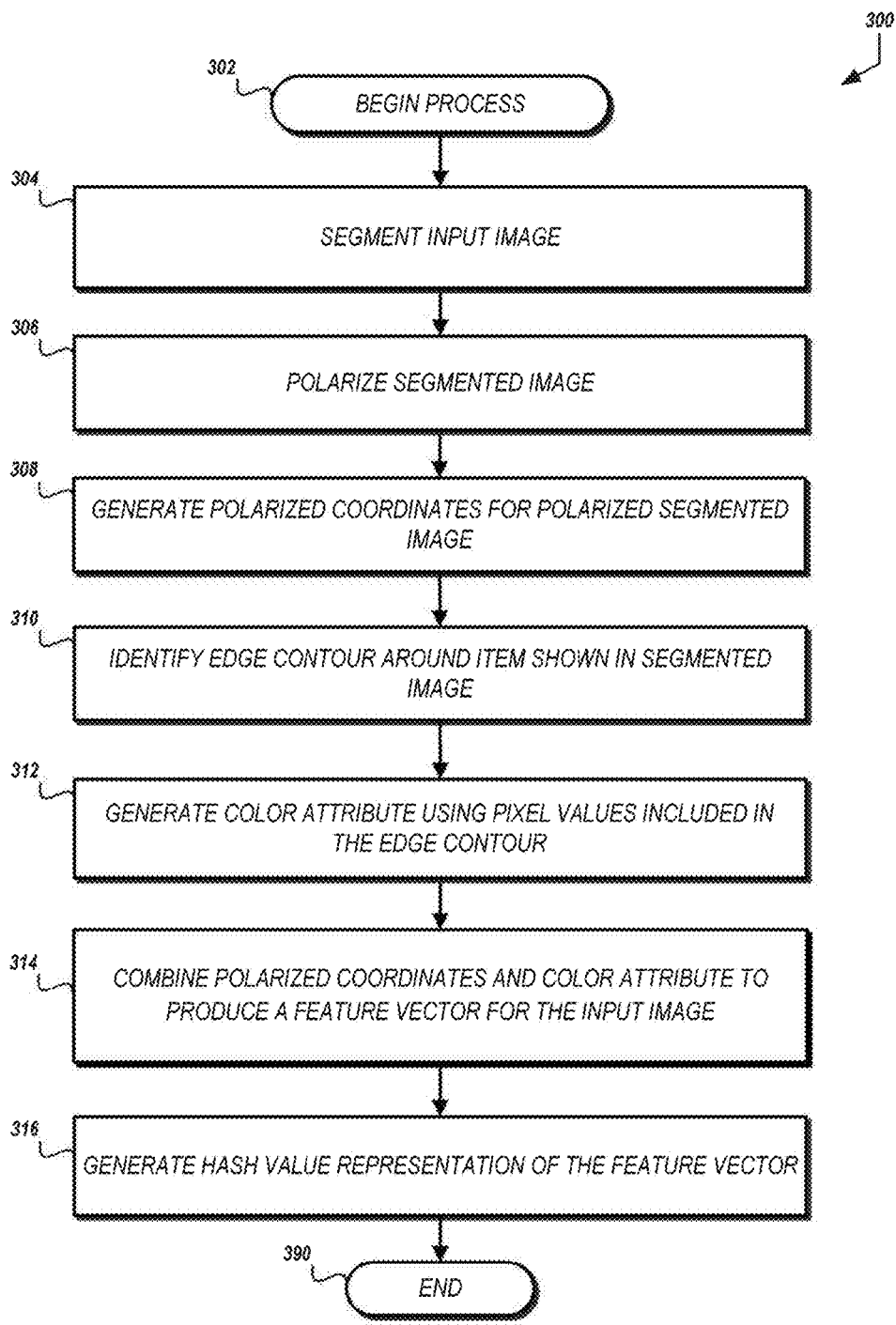
FIG. 3 is a flow diagram depicting an example method implemented in the catalog system for detecting a composite image.

FIG. 3 is a flow diagram depicting an example method implemented in the catalog system for detecting a composite image. The method 300 shown in FIG. 3 may be implemented in whole or in part by the devices described herein such as the composite image processor 129 shown in FIG. 1.

One non-limiting objective of composite image detection is to group together all composite images where the underlying image is the same and the only difference between the composite images is the graphic that has been overlaid on the underlying image. For this task, standard image matching approaches are problematic. Using standard image matching approaches, such as comparing scale-invariant feature transform (SIFT) key points and/or descriptors, two composite images depicting two different shirts with the same graphic could be matched together because the graphics rather than the shirt may influence the matching. Similarly, two composite images depicting the same shirt with different graphics may not be matched if the graphics have strong features that are different. To avoid this problem, the composite image detection method focuses on the shape of the outer contour of the object rather than the entire image.

The method 300 begins at block 302 having received an input image for processing. At block 304, the input image is segmented to separate the background image from the rest of the input image (e.g., the overlaid image and the underlying image). The segmentation may include identifying a contour around an item shown in the input image based on color differential between the pixels representing the item and pixels representing the background. The segmentation may include generating a segmented image whereby the pixels that represent the background have color information removed or a predetermined color value assigned that indicates no color present at the pixel location.

At this point in the method 300, the shape of the outer contour is of interest. At block 306, the segmented image is converted to polar coordinates. After removing the background at block 304, the pixel locations which include color information can be attributed to either the underlying image or the overlaid image. A binary mask may be identified that provides a polarized image. In the polarized image, pixels are either on (e.g., color information is provided) or off (e.g., color information not present or set to a null value due to segmentation of the background image). The polarized image may include pixel data where the item or graphic were shown (e.g., pixel-on) in the input image and will not include pixel data where the background was removed (e.g., pixel-off) from the input image. Accordingly, the polarized image indicates the shape of the item as shown in the input image. However, the portion including pixel information for the overlaid image is used only to the extent it influences the shape of the item. Otherwise, the color or content of the overlaid image is not considered at this point in the composite image detection method 300.

At block 308, polar coordinates for the polarized image are generated using the center of the polarized image as the point of rotation. From the center point, sectors are identified for the polarized image. The sector may be identified by drawing a first line and a second line from the center point to the edge of the polarized image. The first and second lines may be separated by a predetermined number of degrees. For example, if six sectors will be used to represent the shape of the image, the predetermined number of degrees separating each line would be 60 degrees. Accordingly, each sector may identify a wedge-shaped portion of the polarized image.

Figure 4:
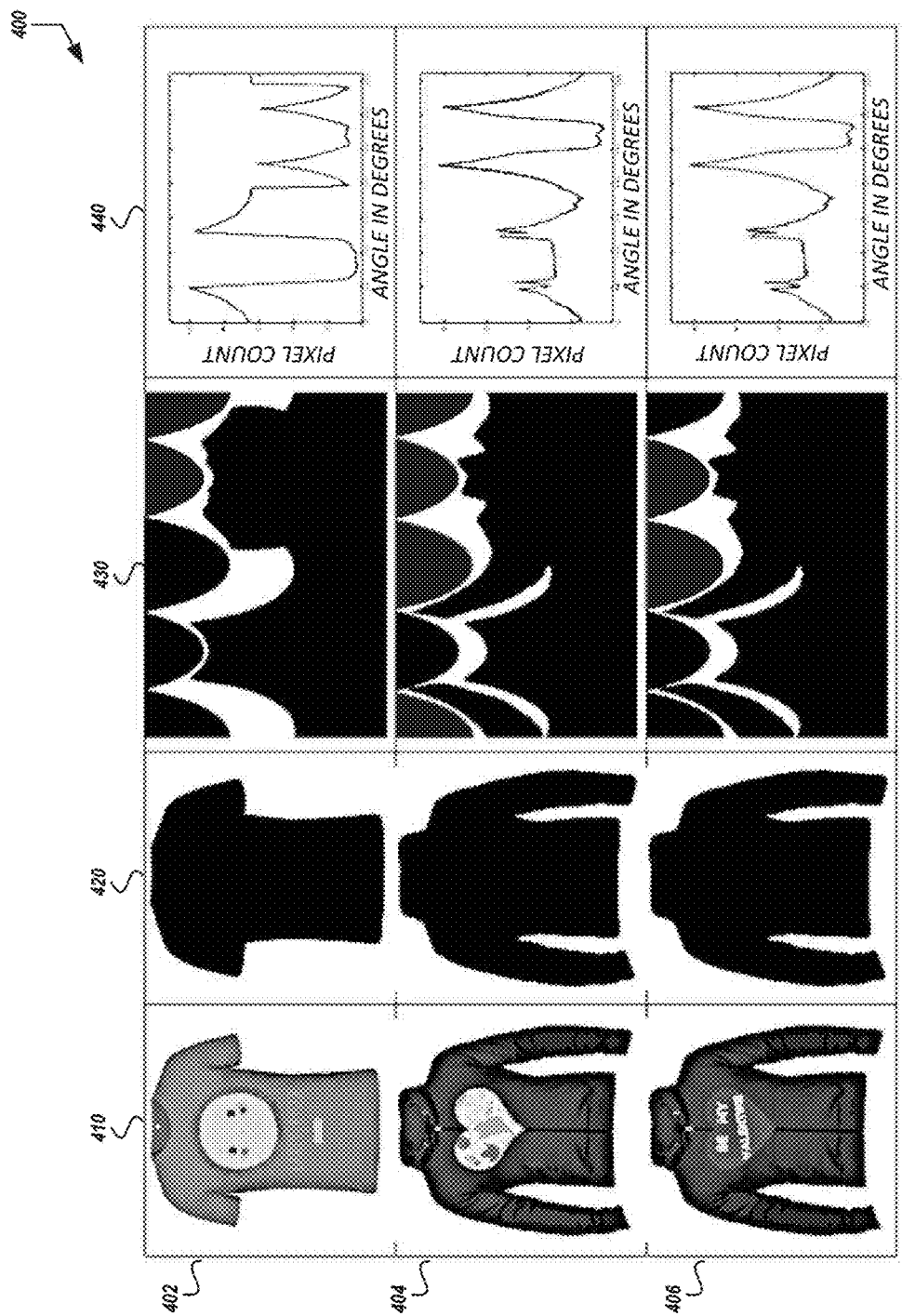
FIG. 4 is pictorial diagram of various composite images detected using the example method of FIG. 3.

In the resulting ρθ polar image, a sum in the ρ direction is generated, which provides the number of "on" pixels in each sector defined by the discretization of the θ angles. This converts the contour into a one-dimensional shape feature vector whose length is the number of unique angles. This can provide a compact representation of the shape of the item shown in the input image. For example, rather than storing and comparing the entire polarized image, this information may be condensed into a short one-dimensional vector. This vector can be used to compare an input image with another composite image such that if the two images have the same feature vector, the images are identified as belonging to the same composite image cluster. One example of composite images having the same feature vector is shown in FIG. 4 where the last two rows, 404 and 406. This example will be discussed in further detail below. The one-dimensional vector may serve as a feature signature for the input image such that all members of the cluster can be identified using the feature signature. The feature signature may include the shape vector information. The feature signature may include other identifying characteristics common across the composite images included in a cluster.

The method 300 may be effective at generating a feature vector representing the shape of the item, but, up to this point in the description, has largely ignored color. This may be desirable for catalog systems which desire a streamlined detection of composite images and clusters thereof. In such implementations, the shape and thus the feature vectors are exactly the same for items such as a first item depicted in black and a second item depicted in blue. While this is not a problem for detecting composite images, it may cause problems when extracting images from a composite image because the optional extraction features consider common pixel colors during the extraction process as will be described.

Because some implementations may wish to cluster not just on shape, but also on color, the method 300 may optionally include enhancing the feature signature to also indicate color. As discussed above, it is desirable to consider the color of pixels representing the item (e.g., the underlying image) and to limit the influence of pixels depicting overlaid objects (e.g., the overlaid image) since the same item (e.g., shirt, mug, hat, jewelry, apparel) may include different overlaid images across input images. At block 310, utilizing the background segmentation already computed, a contour is identified around the item shown in the segmented image. The contour may be identified by starting at an edge of the segmented image and proceeding for each row or column of pixels, pixel-by-pixel until a color value is identified. Once a color value is encountered, this point represents an edge of the segmented image. The collection of these points will identify the outline of the item. In some implementations, the outline may be adjusted to be more than one pixel wide. For example, a two, three, five, seven, or ten pixel contour may be generated.

At block 312, the color values for the pixels included in the contour may be used to generate a color component for the feature signature. In one implementation, the color values may be represented using three color channel values—red, green, and blue. In some implementations, the mean of each of the (R, G, B) channels in this contour may be determined. This three-element set of color values may uniquely define the color of the item while avoiding the graphics region.

At block 314, the shape vector is added (e.g., appended) to the color feature values. The combination of shape and color may be used to uniquely define a composite image. This combination may be the feature signature for the cluster including the, now identified, composite image. The method 300 ends at block 390.

In some implementations, storing the entire feature vector in a data store may not be space efficient. Furthermore, the entire feature vector may not be time efficient when used to cluster images because all elements of the feature vector for pairs of composite images are compared.

To help improve storage and comparison rates, at block 316, the feature vector may be hashed to generate one unique number for each feature vector that can be easily queried. Composite images belonging to a given cluster may have the same hash value. The composite image file name (e.g., file name as transferred to the system 100 or name assigned to the composite image file) and hash values are stored in a data store for fast and space-efficient indexing and search.

To implement a real-time composite image detection system, it may be desirable to provide a data storage framework that is scalable and enables fast search and retrieval. In some implementations, the composite image name and the hash of its feature vector may be stored in a data store such as a database. The data store may then be indexed on either or both values for a given composite image. The hashing may be selectively performed. For example, based on the target catalog system, a specific hashing process may be applied. The hashing may be selected by comparing the target catalog system to a composite image processing configuration value. In some implementations, a feature of the composite image may be used to dynamically select the hashing for the feature vector. For example, metadata about the composite image (e.g., category of an item shown, provider of the item shown, etc.) may be used to identify the hashing for the composite image.

FIG. 4 is pictorial diagram of various composite images detected using the example method of FIG. 3. The diagram 400 includes a column for each representation of a composite image as it is processed, such as according to the method shown in FIG. 3. Each row represents a composite image. The representations shown in FIG. 4 may be received by or generated by the devices describe and shown in this application such as in FIG. 1.

Three composite images are shown in FIG. 4. In a first column 410, respective original composite images are shown in rows 402, 404, and 406. The original composite images in the first column 410 represent the image as uploaded to the system.

In a second column 420, Cartesian representations of the segmented image of the composite images are shown. The images included in the second column 420 are representations of the item shown with no detail for the overlaid graphic. As the image is segmented, pixel data for the background may be removed. Accordingly, the segmented images in the second column 420 may provide pixel data for identifying the shape of the item shown in the original composite image.

In a third column 430, the polar representations of the segmented images are shown. For a sector of the segmented polarized image, the polar representation maps the pixel value from the segmented image (e.g., a pixel on or a pixel off value) for each pixel in the sector. The pixel data from each sector is then plotted to generate the polar representations shown in the third column 430.

Using one or more sectors, a discrete count of pixels on or off within the sector(s) can be generated. These counts represent the shape of the item shown in the composite image. As shown in FIG. 4, in a fourth column 440, counts are taken in one degree increments for the number of on pixels (e.g., white) in the polar representation. In some implementations, the count may be taken for the number of off pixels to provide a different representation of the shape of the item. For each degree, the count of on pixels is potted on the graph to provide the representations shown in the fourth column 440.

As shown in FIG. 4, the composite images in the second row 404 and the third row 406 show items having the same shape. Thus, even though the graphic overlaid on the item is different and, in some implementations, the color of the item may be different, these composite images would be identified as being in the same cluster.

The counts shown in the plots in the fourth column 440 may be collected into a shape vector for further processing as described herein such as in reference to FIG. 3.

Figure 5:
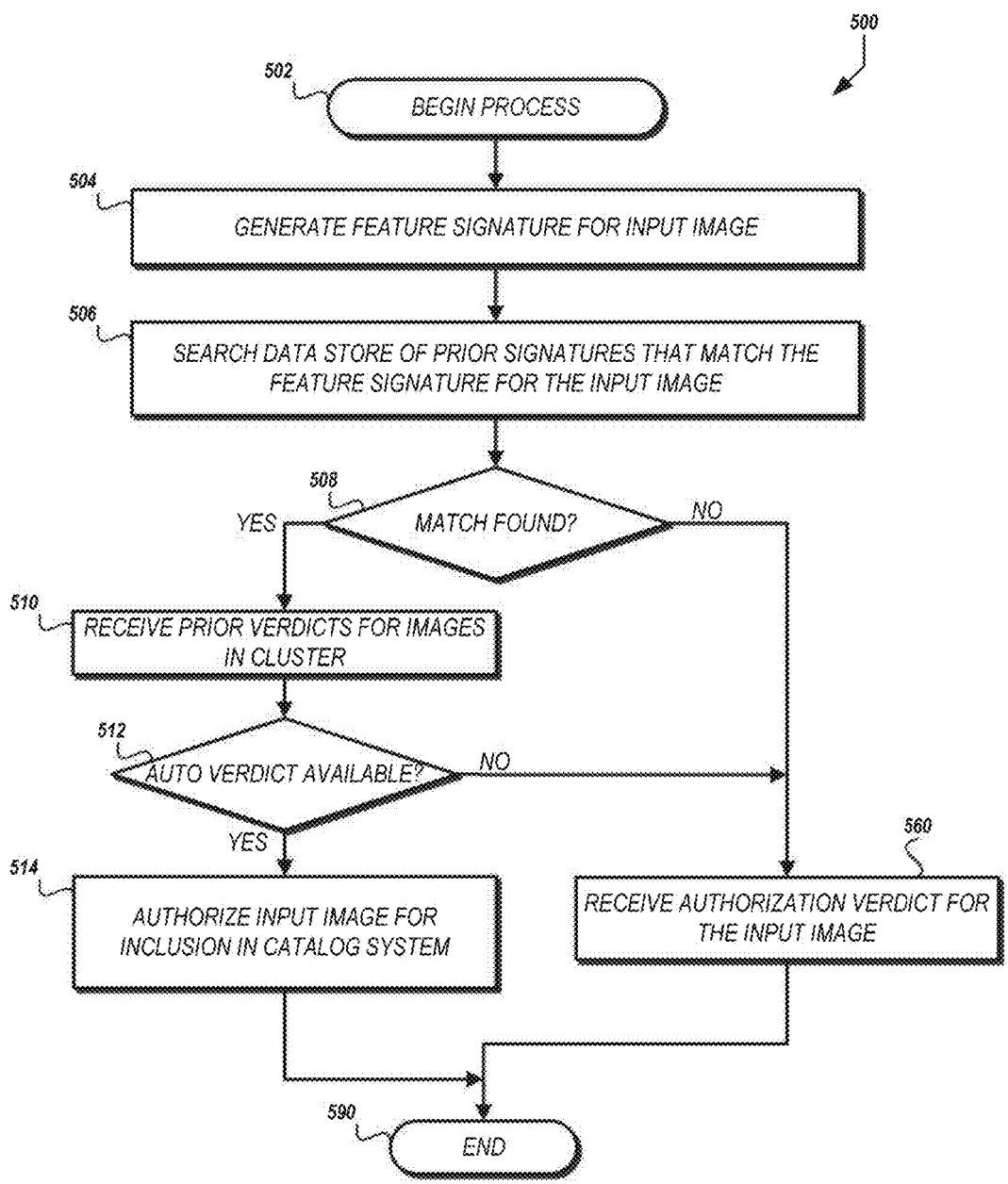
FIG. 5 is a flow diagram depicting an example method implemented in the catalog system for authorizing a composite image.

FIG. 5 is a flow diagram depicting an example method implemented in the catalog system for authorizing a composite image. The method 500 shown in FIG. 5 may be implemented in whole or in part by one or more of the devices described herein such as those in FIG. 1.

The method 500 begins at block 502 with the receipt of an input image for authorization. At block 504, a feature signature for the input image is generated. The feature signature may be generated using at least a portion of the method shown in FIG. 3.

Using the feature signature, at block 506, a data store of feature signatures is searched. The search is performed to identify whether the input image correlates with a previously identified composite image cluster, and thus is in fact a composite image too.

At block 508, a determination is made as to whether any matches were found. If not, at block 560 the input image may be forwarded through a standard authorization flow. The flow may include automated authorization, manual authorization, or some combination thereof.

Returning to block 508, if the input image matches a feature signature for a cluster, at block 510, previous verdicts for the composite images in the cluster are received. The verdicts may be stored in an authorization verdict data store. In some implementations, the catalog system may be queried to determine prior authorization. Since only authorized images appear in the catalog system, if a composite image is available via the catalog system, the composite image was authorized.

At block 512, a determination is made as to whether the number of positive verdicts exceeds an auto-approve threshold. It may be desirable to allow automatic approval of a newly identified composite image only where a pre-determined number of composite images within a cluster have received a positive verdict. The number may be expressed as a total number of positive verdicts, percentage of positive verdicts, or other similar metric.

If the auto-approve threshold is exceeded, at block 514, the input image may be approved for inclusion in the catalog system. If the threshold is not exceeded, at block 560, the input image may undergo additional authorization processing including automated authorization, manual authorization, or some combination thereof. If being provided for manual authorization, the input image may be forwarded to the quality assurance workstation with the identified cluster information included. The quality assurance workstation may be configured to group composite images belonging to the same cluster. This allows a quality assurance workstation to perform a sampled review of a pre-determined number of composite images from the cluster. Then, based on the sampled verdicts, a verdict can be applied to all composite images within the cluster queued for authorization. The method 500 ends at block 590 having generated an authorization verdict for the received image.

Figure 6:
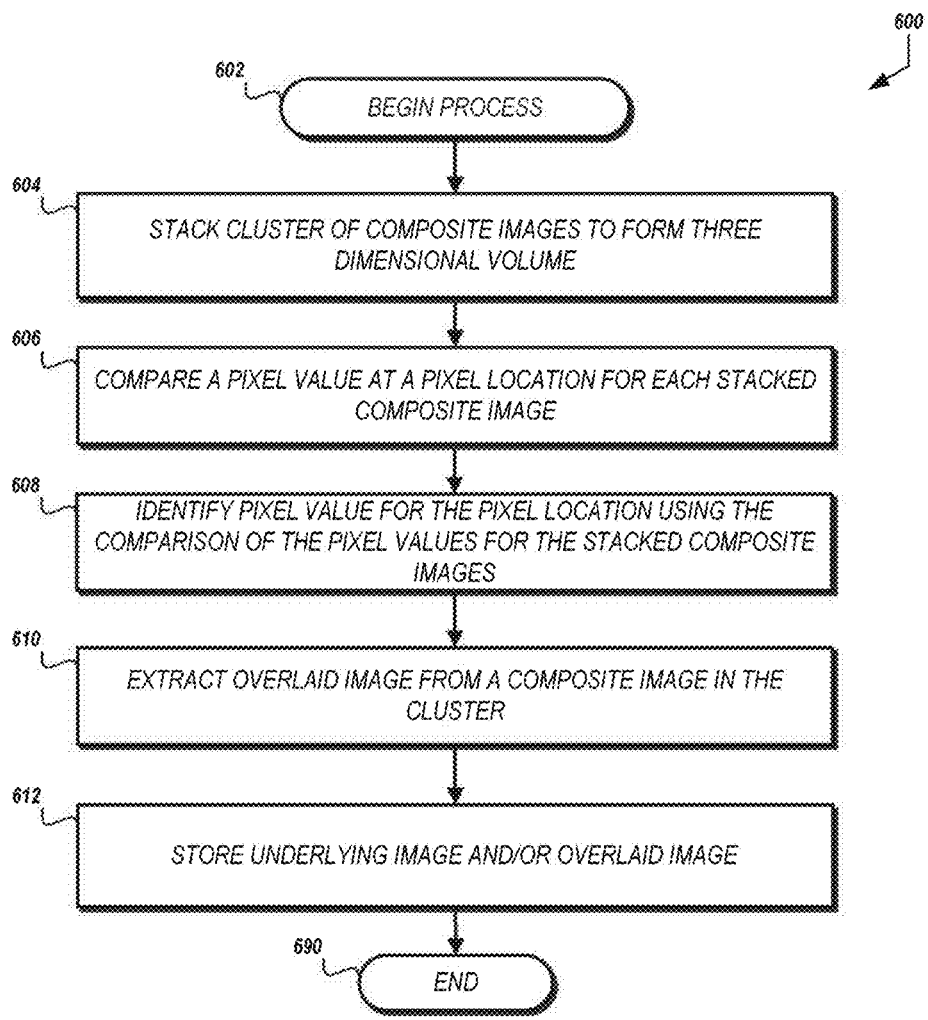
FIG. 6 is a flow diagram depicting an example method implemented in the catalog system for extracting an overlaid image from a composite image.

FIG. 6 is a flow diagram depicting an example method implemented in the catalog system for extracting an overlaid image from a composite image. The method 600 may be performed in whole or in part by one or more of the devices described herein such as the composite image processor 129 shown in FIG. 1.

Having described one way composite images can be clustered, the clusters of composite image may be further processed in a way that advantageously leverages the common item shown in each composite image in the cluster. One form of processing can use the combination of composite images within a cluster to extract the overlaid image. Extracting the overlaid image enables more detailed analysis of the overlaid image itself as separated from the remaining content included in the composite image. By extracting and processing the overlaid image, additional assessment of a composite image can be performed such as determining whether the overlaid image includes prurient subject matter, is hand-sketched, or includes improper text.

The method 600 begins at block 602 with an identified cluster of composite images. At block 604, the composite images from the identified cluster are stacked into a three-dimensional volume. This stacking provides a measurement of the pixels across the cluster of composite images for a particular pixel location.

At block 606, pixel values at a given location for the cluster of images are compared. Different overlaid images may cover different parts of the composite image (e.g., of the item shown in the underlying image). The underlying image can be reconstructed if enough composite images are used such that the underlying image is visible (rather than the overlaid image) for every pixel in at least some subset of the composite images.

FIG. 7 depicts two example composite images having the same underlying image. A first composite image 702 and a second composite image 704 show the same item (a sweatshirt) with different graphics overlaid on the item. As shown, the graphic patterns overlaying the item in each composite image cover different pixel locations. For a given pixel location, it is unlikely that multiple composite images will have exactly the same color value as a color value belonging to a graphic. Statistically speaking, the chances of two random pixels having the same color value may be 1 in 65,536. However, if the given pixel belongs to the underlying image and that pixel location in another composite image also corresponds to the underlying image, both pixels at that location will have the same color value.

One way to compare the pixels is to compute the mode of the (R, G, B) pixel value for all composite images at a particular location on a pixel-by-pixel basis. The pixel values for the underlying image may correlate and thus both represent pixel information from the underlying image rather than from the overlaid image.

The comparison may be a dynamic comparison. For example, the comparison of pixel data may be adjusted depending on the item shown in the composite image. The item may be detected using image recognition information. The item may be detected using information included when the composite image is transferred to the system. For example, the image gateway may receive a desired category in which information for the item should be listed in the catalog system. Using this item information, a comparison may be selected for processing the input image transferred to the system. The selection may be made from a library of stored comparison instructions.

For example, jewelry is often bright and silvery. For composite images including jewelry, using the maximum pixel values instead of the mode for the comparison may provide a more accurate extraction. This small change can be made to the extraction, allowing the same system and/or method to be adaptively configured for different contexts. In some implementations, such as where items are photographed against a dark background, it may be desirable to use the minimum pixel values for the comparison.

Returning to FIG. 6, at block 608, the result of the comparison at each location is used to identify a pixel value for the underlying image. For example, the underlying image may be generated using, for each pixel location, the mode RGB value of the cluster of composite images for every location.

Having identified the underlying image, the composite image may be further processed at block 610 to extract the overlaid image. To extract the overlaid image, the underlying image data may be compared to the composite image. Where a pixel value for a pixel location in the underlying image correlates to the pixel value in the composite image, the location can be identified as including graphic information for the underlying image and not the overlaid image. If the values are different, then the pixel can be attributed to the overlaid image. These pixels may be stored in a new image file to provide an image file including only the overlaid image. Once each location is processed, the new image file will include only the pixel values attributable to the overlaid image. The method 600 ends at block 690.

Accordingly, images for both the underlying image (e.g., pixels showing the item) and overlaid image (e.g., pixels showing the graphic overlaid on the item) may be generated from a composite image. At block 612, one or both of the underlying image or overlaid image may be stored for further processing, such as authorization for inclusion in the catalog.

Depending on the comparison implemented at block 604, the number of composite images included in the cluster to perform the comparison may change. For example, the use of the mode to extract information from a cluster of composite images for each pixel location may be suitable for clusters of at least three composite images. If those three composite images have sparse graphics (such as text) that do not overlap each other, then a perfect underlying image may be reconstructed because each pixel location will have at least two pixels that represent the item shown in the underlying image so the mode pixel value will represent the item shown by the underlying image. Two composite images may not be sufficient in some implementations because it may result in ambiguity over which pixel is overlaid image pixel and which is an underlying image pixel such as when the comparison for a particular location yields a disagreement or ambiguous result. In practice, many overlaid images do overlap, and experimental results have found that around 40 composite images may be sufficient to reconstruct a near perfect underlying image. However, the number of composite images to reliably extract the underlying image for a cluster may depend on the extent of overlap of the overlaid images included in these composite images.

Experimental data shows that more composite images can lead to better reconstructions because it leads to a better chance to find non-overlapping overlaid images.

Figure 8:
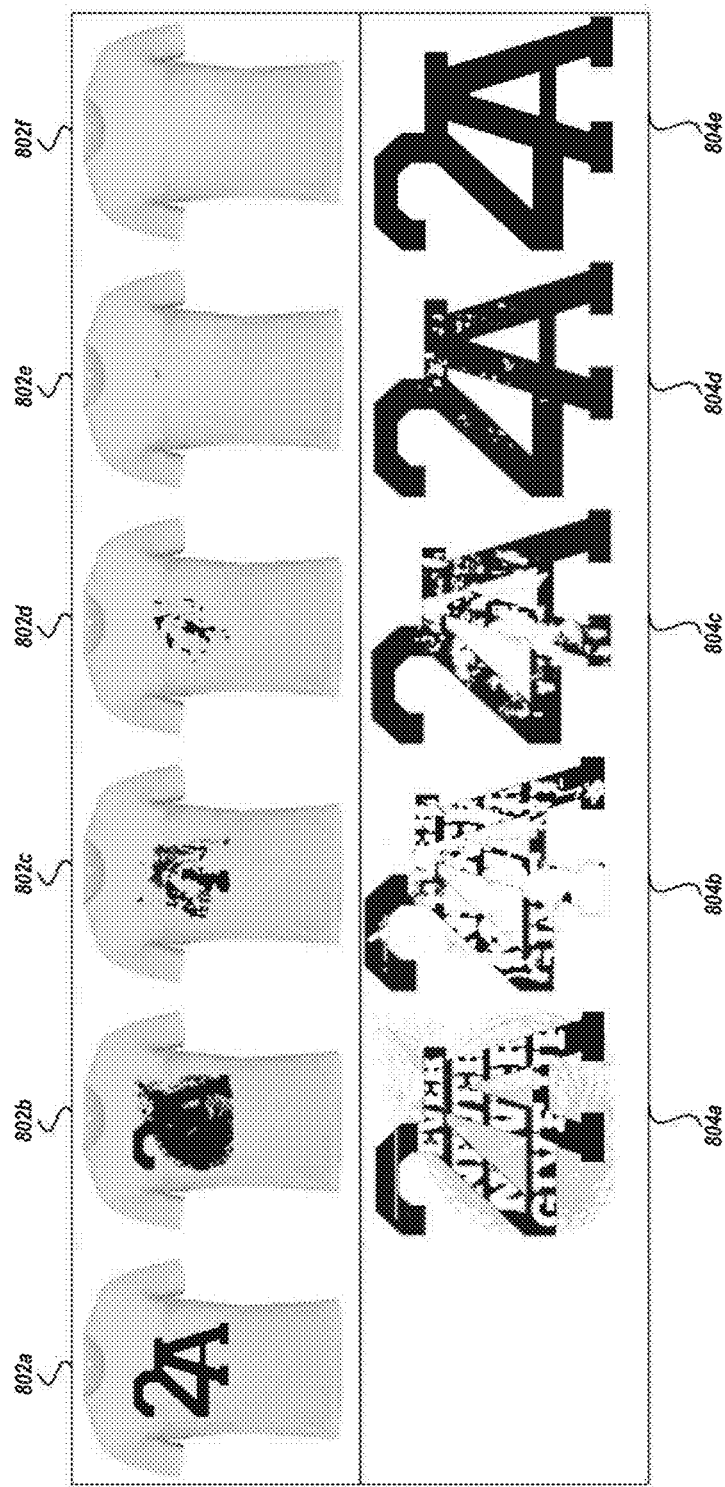
FIG. 8 depicts example overlaid images extracted from composite images having the same underlying image.

FIG. 8 depicts example overlaid images extracted from composite images having the same underlying image. FIG. 8 shows a composite image 802a including a t-shirt with a graphic overlaid in the first column. In successive columns, the underlying image is extracted using the mode of increasing numbers of composite images. In these extracted underlying images 802b, 802c, 802d, 802e, and 802f, several non-shirt regions are shown in the images which indicate regions where pixels depicting the shirt were obscured by the graphics in all of the composite images. To extract the underlying image, these regions may be set to black by using as a mask the mode count at each pixel location. For example, if the mode count for a location is 1, that pixel location is set to black in the underlying image. These black regions become sparser as more composite images are added to the cluster, and the underlying image becomes increasingly clean and graphic-free. Thus, the more composite images in the cluster that are available for processing, the more likely it is that a non-graphic pixel will be discovered for every region in the composite image.

The bottom row of FIG. 8 shows that the extracted graphic on the t-shirt may also become more accurate with increasingly numbers of composite images. To extract the overlaid image, all pixels where the composite image is different from the extracted underlying image are identified. In the extracted overlaid image, the pixel value is set to the value from the composite image for locations where the pixel values are different for the composite image and the underlying image. The pixel value may be set to white at locations where the pixel values are the same.

In some implementations, it may be desirable to perform additional image processing on the extracted overlaid image and/or underlying image to handle compression artifacts or spurious pixels. Extracted images may also be close-cropped by computing the bounding box for the extracted image.

Extracting the overlaid and underlying images can be effective to parse composite images regardless of the color, appearance, or texture of the underlying images as long as there are a sufficient number of composite image samples. The accuracy may be improved with greater training data (e.g., increased cluster size). Thus, if new extracted underlying and/or overlaid images are added to the system, as they are uploaded to the system, each additional image may improve the graphics extraction so that the entire system will continually improve over time. TABLE 2 summarizes the number of composite images in the cluster used to generate the extracted images shown in FIG. 8.

TABLE 2

| Underlying Image | Overlaid Image | Cluster Size |
|---|---|---|
| 802b | 804a | 4 images |
| 802c | 804b | 10 images |
| 802d | 804c | 20 images |
| 802e | 804d | 40 images |
| 802f | 804e | 140 images |

Figure 9:
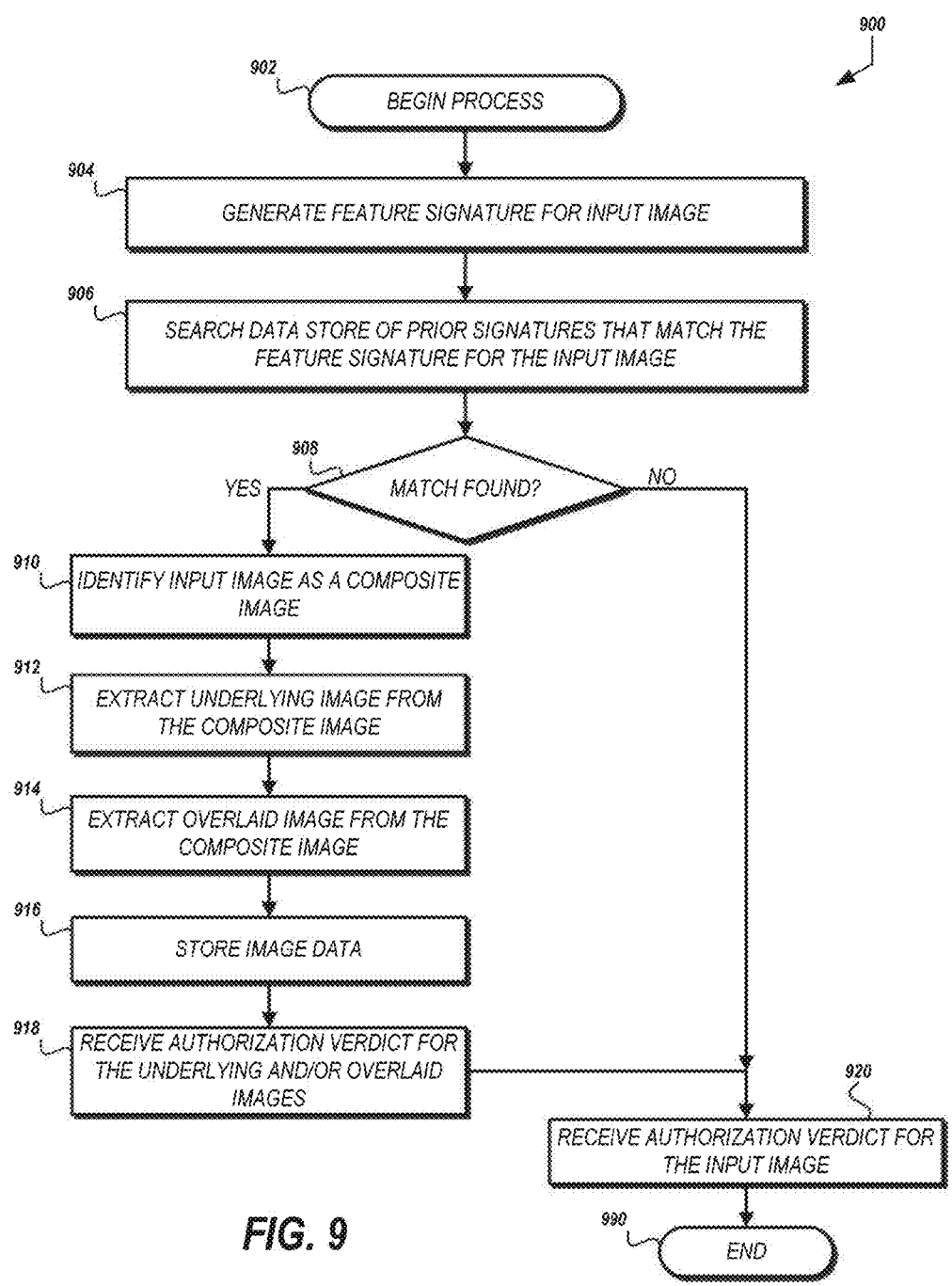
FIG. 9 is a flow diagram of an example method implemented in the catalog system for processing a composite image.

The detection, extraction, and storage of composite images may be integrated into a single process. FIG. 9 is a flow diagram of an example method implemented in the catalog system for processing a composite image. The method 900 may be implemented in whole or in part by one or more of the devices described herein such as those shown in FIG. 1.

The method 900 begins at block 902 with receipt of an input image for inclusion in the catalog system. At block 904, a feature signature is generated for the input image. The feature signature may be generated using a method similar to that shown in FIG. 3. The signature may be a hash of a feature vector identifying the shape and color of an item included in the underlying image portion of the composite image. This signature may represent the input image as a single numeric value.

At block 906, a data store of previously generated signatures is searched using the feature signature from block 904. The search may identify entries having the same signature and provide composite image names for the matches.

At block 908, a determination is made as to whether any search results are returned. If at least one correlating composite image is returned in the search result, at block 910, the input image is identified as a composite image.

At block 912, the underlying image is extracted from the composite image. The underlying image may be extracted using a previously extracted underlying image for the cluster. Where no existing underlying image has been extracted, the extraction at block 912 may include executing the method shown in FIG. 6.

At block 914, the overlaid image may then be extracted from the composite image by comparing the extracted underlying image to the composite image. In some implementations, the cluster of composite images to which the composite image belongs may be used to extract the overlaid image, such as described in FIG. 6.

At block 916, the image data (e.g., composite image and feature signature) may be added to the data store. If extracted overlaid image and/or underlying image were extracted from the composite image, either or both of these may also be added to the data store.

At block 918, authorization verdicts may be received for the underlying and/or overlaid images. The authorization verdict may be received from a quality assurance workstation. In some implementations, the authorization verdict may be received from an optical character recognition system. The optical character recognition system may be configured to identify words or phrases contained in an image. If the identified words are included on a list of words which are not allowed to be presented in the catalog system (such as a profanity), the verdict may indicate that the image is not authorized for inclusion in the catalog system. If the words are not identifiable, the image may be routed for review such as via the quality assurance workstation. The authorization may also include image quality checks. For example, the number of pixels used for the image, size of the image, sharpness of the image, and the like may be assessed using image feature detection.

Returning to block 908, if no correlations were found or if the underlying and overlaid images are authorized, the input image, as a whole, may be subjected to authorization. At block 920, an authorization verdict for input image is received. As with the underlying and overlaid images, the input image may be authorized by the quality assurance workstation and/or automated authorization. If the input image is identified as a composite image, it may be authorized using features described in FIG. 5. The authorization may consider image quality, image content (e.g., profanity, nudity, etc.), or both. The method 900 ends at block 990.

Figure 10:
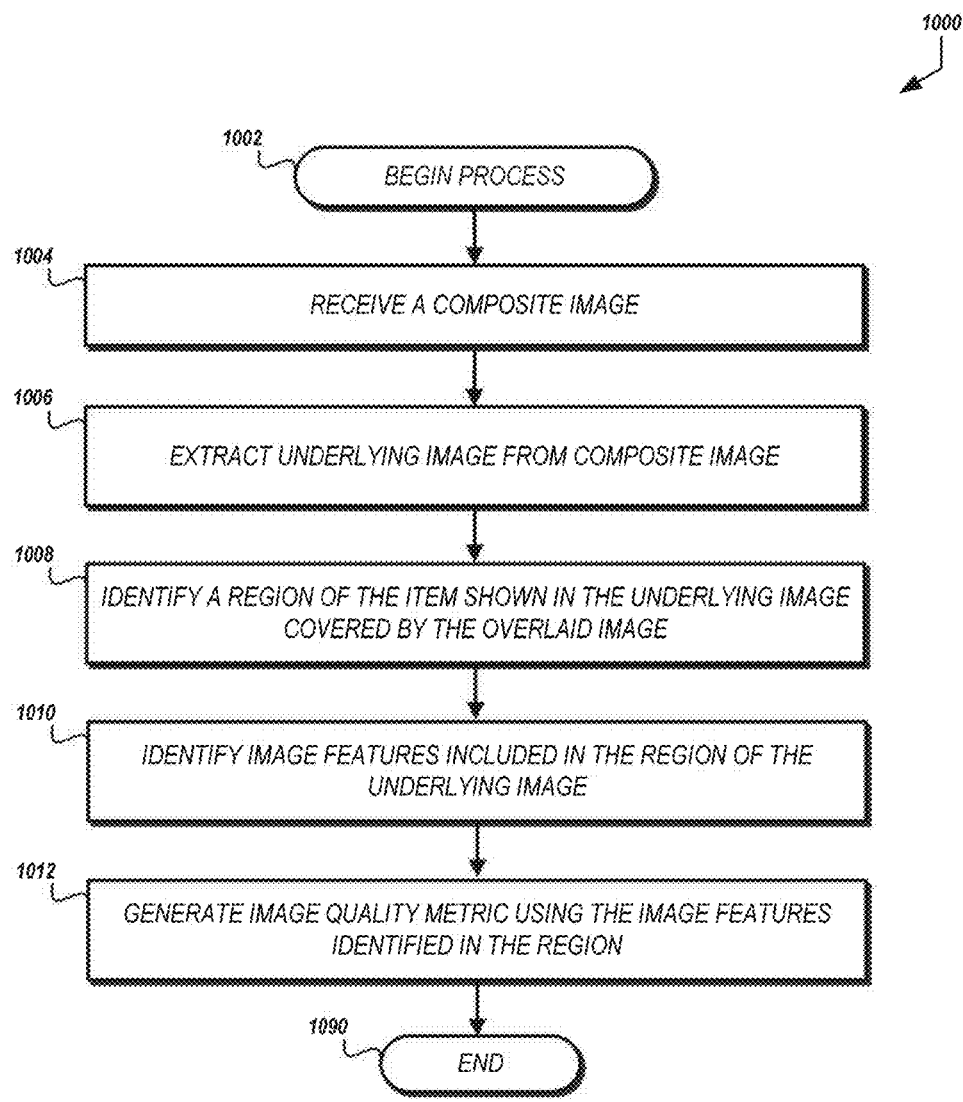
FIG. 10 is a flow diagram of an example method implemented in the catalog system for generating a quality metric for a composite image.

FIG. 10 is a flow diagram of an example method implemented in the catalog system for generating a quality metric for a composite image. The method 1000 may be implemented in whole or in part by one or more of the devices described herein such as those shown in FIG. 1.

The method 1000 begins at block 1002 with the initiation of composite image quality detection. The initiation of the method 1000 may be triggered by the transfer of a new composite image to the system 100. The initiation of the method 1000 may be triggered by a step in the authorization process. For example, the quality may be assessed if the image is authorized for inclusion in the catalog system 150 or passes one or more stages of authorization (e.g., is of acceptable size). The initiation of the method 1000 may be triggered when an input image is identified as a composite image, such as via the method 300 shown in FIG. 3.

A composite image is received at block 1004. The composite image may be received at the composite image processor 129 from the quality assurance workstation 170 or the image data store 140.

At block 1006, an underlying image included in the composite image is extracted. The extraction of the underlying image may be performed using the method 600 shown in FIG. 6. In some implementations, the underlying image may have been previously extracted such as during composite image detection. In such implementations, the underlying image may be stored in the image data store 140 and retrieved from the data store 140 at block 1006.

At block 1008, a region of the item shown in the underlying image that is covered by the overlaid image is identified. In some implementations, the overlaid image may be extracted from the composite image. In such implementations, the region covered by the overlaid image may be identified by aligning the overlaid image with the pixel data in the composite image that correspond to the overlaid image pixel data. Once aligned, the location of the overlaid image in the composite image may be determined. The location may be indicated using a single point within the composite image such as the X,Y pixel location of the upper left corner of the overlaid image. This point may be referred to as an anchor point for a shape formed by the overlaid image. From the anchor point, the region covered by the overlaid image may be calculated using the dimensions of the overlaid image. For example, if the overlaid image is 200 pixels wide and 200 pixels high, a bounding box identifying the region covered by the overlaid image can be expressed using four coordinate pairs, each pair indicating a corner of the bounding box: (X,Y), (X+200,Y), (X+200,Y+200), and (X, Y+200). In some implementations, the overlaid image region may form another geometric shape such as an oval or triangle. The geometric shape may be symmetric or asymmetric. The dimensions of the shape in conjunction with the anchor point may identify where and what form the shape takes.

In some implementations, the overlaid image may be text or non-geometric shapes. In such implementations, the overlaid image may be used to generate a mask to identify the region covered by the overlaid image. For example, a set of pixel locations in the composite image including pixel values of pixels depicting the overlaid image may be identified. The locations may be non-contiguous. The region of the composite image covered by the overlaid image may include these identified pixel locations.

The method 1000, up to this point, has identified the region of the underlying image that the overlaid image covers. As discussed above, the underlying image may show an item such as a shirt, pants, dress, hat, mug, or other item which may include ornamental or functional features that a user browsing the catalog system 150 may be interested in such as zippers, pockets, seams, clasps, handles, bevels, or the like. In some implementations, it may not be possible to analyze all aspects of the composite image to assess the quality of the item depicted. As such, the method 1000 may be used to direct the quality analysis to a particular portion of the composite image to expedite the quality analysis process.

At block 1010, image feature analysis is performed on the portion of the underlying image corresponding to the region covered by the overlaid image. The image feature detection may include machine learning models trained to compare pixel values to detect specific image features (e.g., zipper), color changes, edges, gradients, textures, or other image features shown within the region of the underlying image. The image feature analysis may include counting a number of features detected or counting specific types of features detected. The image feature analysis may include a confidence value for each feature detected indicating a degree of certainty for the detected feature.

For example, where the image feature type is an edge image feature, the image feature analysis may include identifying a change in color values between a first pixel within the region of the underlying image and a second pixel within the region of the underlying image. If the distance between the first pixel and the second pixel correlate to a threshold distance and the change in color exceeds a threshold, an edge image feature may be present in the region of the underlying image. In some implementations, several adjacent pixel locations may be identified as meeting the edge image feature. In such implementations, the edge image feature may be indicated for the group of adjacent pixels identified as being the edge image feature. The thresholds for distance and color change may be dynamically identified such as based on a characteristic of the item shown in the underlying image such as the item type, the entity (e.g., user) who transferred information about the item, or the catalog system in which the entity wishes to list the item.

At block 1012, an image quality metric may be generated using the image feature information detected at block 1010. The image quality metric may be generated by comparing the number of features detected to a threshold. For example, it may be acceptable to obscure four edges within an overlaid image. The threshold may be dynamically assessed such as based the type of item shown in the underlying image. For instance, t-shirts may have a lower threshold of features than a mug since hidden features of a clothing item impact the overall look and fit of the item can matter much more in wearable items than in a household good like a mug. The image feature detection information may be weighted using the confidence value for the associated feature. This allows features which have a low confidence to impact the overall quality assessment at a lower degree than another feature which may have a high confidence value. The weights may be generated from training data using machine learning.

In some implementations, the image quality metric may be provided as a single metric value. In this way, one value can be generated based on a partial analysis of the composite image. In some implementations, the image quality metric may be combined with additional composite image quality measures to refine the overall quality assessment for the composite image. For example, the resolution of the composite image may be used to adjust the quality metric such that higher quality images may be more tolerant of hidden features because the detail afforded by higher quality images may include the visual detail to infer the hidden features.

In some implementations, wavelets and/or Fourier analysis can be used to detect the smoothness of the region. The smoothness values generated by such analysis may be used to generate the image quality metric. Other analysis of the image information may be included in the alternative or in conjunction with those described, such as entropy and variance to detect the variation in intensities, or co-occurrence matrices to measure texture.

At block 1090 the method 1000 ends. The image quality metric may be stored in the image data store 140 for further processing such as consideration during the authorization of the composite image. For example, an image authorization rule may be included which identifies a target image quality and an associated authorization result for composite image correlating with the target image quality. The target image quality may indicate one or more of the types of image features detected in the composite image and the quantity of features detected of an individual type. In such implementations, the image quality metric for a composite image may be compared to the image authorization rule. Where the image quality metric meets the minimum quality threshold included in the rule, the authorization result indicated by the rule is applied to the composite image. For instance, if the image quality metric does not meet the minimum quality threshold, the composite image may not be authorized for inclusion in the catalog system 150. In some implementations, feedback may be provided to the entity that transferred the composite image to the system 100 with the aim to provide guidance in composing composite images.

The feedback may include transmitting a message to an electronic device of an entity that provided the composite image. In some implementations, the message may cause the electronic device to auto-launch an image processing application to access more detailed information about the composite images and/or ways to improve the composition of the composite images. The message may include individual scores indicating the quality of individual composite images. The message may include an aggregated score indicating the overall quality of the composite images provided by the entity or overall quality of images within a cluster. The scores may be generated using the image quality metrics. In some implementations, a score may be included in the message transmitted to the electronic device of the entity that provided the composite image. This score may be used by the electronic device to select content to present upon auto-launch. For example, if the score indicates a very poor quality, basic educational content on composite images may be presented. If the score indicates a high quality composite image, the content may be directed to enhancing the images or overall catalog visibility of the composite images.

As discussed above, composite images may belong to a cluster of composite images. In some implementations, it may be desirable to apply the quality metric generated for one composite image in a cluster to other composite images within the cluster. For example, the same quality metric may be applied to all composite images within a cluster. In some implementations, a quality metric may be determined for a cluster by generating quality metrics for a sampling of composite images within the cluster. The sampling may include identifying a portion of the cluster for which image quality metrics will be generated. Then, based on the image quality metrics generated for the portion of the cluster, a cluster quality metric may be generated. The cluster quality metric may be generated by averaging the individual image quality metrics generated for composite images included in the portion of the cluster.

FIG. 11A depicts another example composite image formed from an underlying image and an overlaid image. The composite image 1110 includes an underlying image 1102 showing a sweatshirt and an overlaid image 1104.

FIG. 11B depicts a region of the underlying image of FIG. 11A identified for quality analysis. The underlying image 1102 has region 1106 that is obscured by the overlaid image 1104. The region 1106 may be where the quality analysis is focused to identify image features and other visual artifacts of the item shown in the underlying image 1102 that are not visible due to the overlaid image 1104. In some implementations, it may be desirable to expand the region 1106 to allow for comparisons of pixel data in the region 1106 of the underlying image 1102 with pixel data near the border of the region 1106. Such expansion may be included as a default value such as a number of pixels. The expansion may be dynamically configured based on the item type shown in the composite image 1100. For example, it may be desirable to consider pixels within the region 1106 enlarged by 10 pixels for clothing items. However, for jewelry, no expansion of the region 1106 may be needed due to a relatively uniform construction of most items shown in the underlying image.

FIG. 11C depicts features included in the region of the underlying image that contribute to the quality metric analysis. As shown in FIG. 11C, the region 1106 includes three detected image features: (1) a first pocket 1108; (2) a second pocket 1110; and (3) a zipper 1112. In some implementations, the physical identity of the features may not be determined (e.g., zipper, pocket, handle). In such implementations, the pixel differences (e.g., edge or color changes) may be the identified feature. The strength of such differences may also be determined as part of the image feature detection. For example, if a color changes from the upper left corner of the region 1106 to the lower right corner of the region 1106 on a smooth gradient, this color change may be identified as a low strength image feature. In the case of the zipper 1112, the color change between pixels representing the zipper 1112 and pixels surrounding the zipper 1112 may be more substantial. In such instances, the detected image feature may be identified as a higher strength image feature. The strength may be used to emphasize certain image features when generating the quality metric for the composite image as described above.

Figure 12:
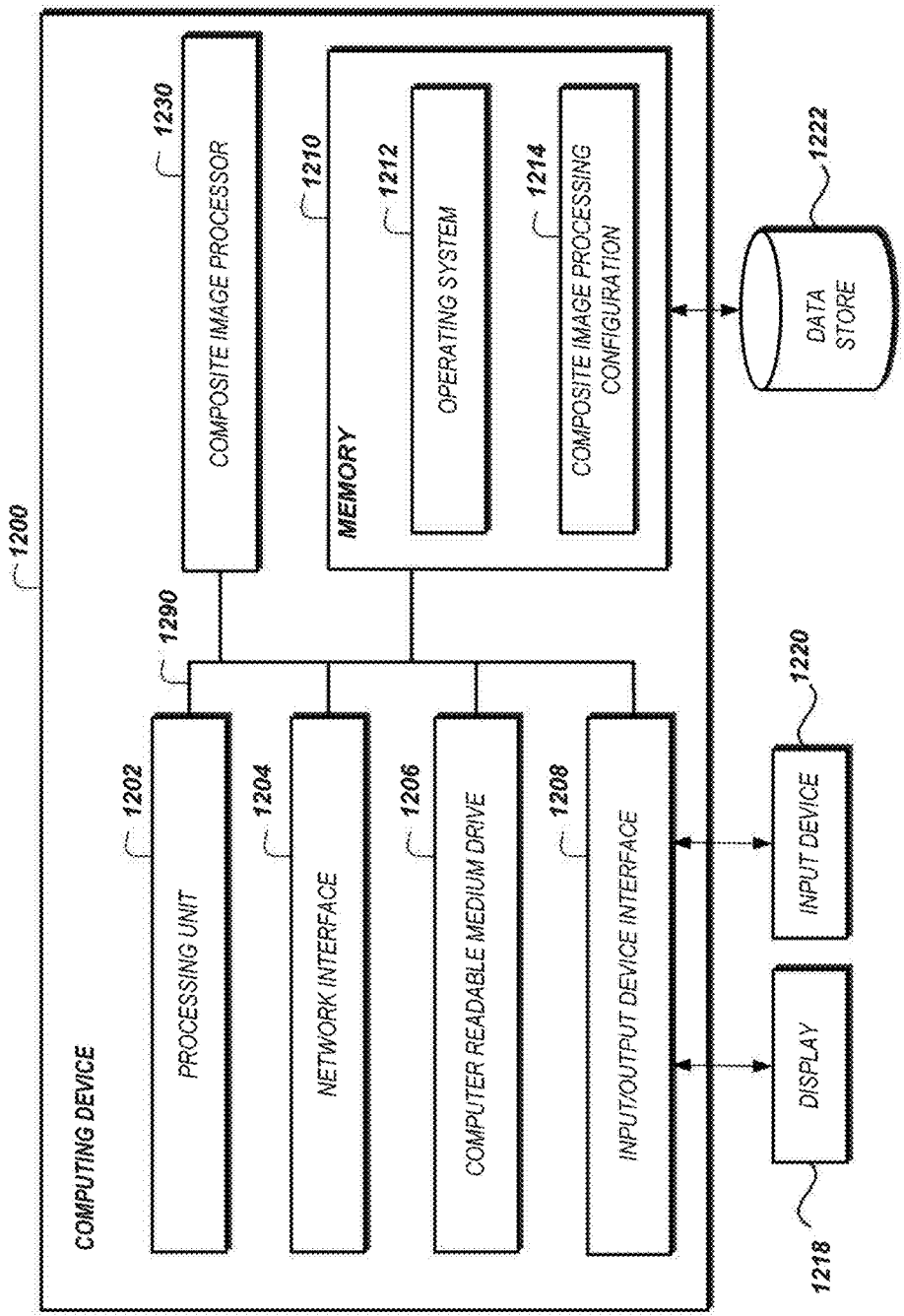
FIG. 12 is a block diagram of an illustrative computing device of the catalog system that may implement the methods of FIGS. 3, 5, 6, 9, and 10.

FIG. 12 is a block diagram of an illustrative computing device of the catalog system that may implement the methods of FIGS. 3, 5, 6, 9 and 10. The computing device 1200 can be a server or other computing device, and can comprise a processing unit 1202, a composite image processor 1230, a network interface 1204, a computer readable medium drive 1206, an input/output device interface 1208, and a memory 1210. The network interface 1204 can provide connectivity to one or more networks or computing systems. The processing unit 1202 can receive information and instructions from other computing systems or services via the network interface 1204. The network interface 1204 can also store data directly to memory 1210. The processing unit 1202 can communicate to and from memory 1010 and output information to an optional display 1218 via the input/output device interface 1208. The input/output device interface 1208 can also accept input from the optional input device 1220, such as a keyboard, mouse, digital pen, microphone, mass storage device, etc.

The memory 1210 contains computer program instructions that the processing unit 1202 executes in order to implement one or more embodiments. The memory 1210 may include RAM, ROM, and/or other persistent, non-transitory computer readable media. The memory 1210 can store an operating system 1212 that provides computer program instructions for use by the processing unit 1202 or other elements included in the computing device in the general administration and operation of the computing device 1200. The memory 1210 can further include computer program instructions and other information for implementing aspects of the present disclosure.

For example, in one embodiment, the memory 1210 includes a composite image processing configuration 1214. The composite image processing configuration 1214 may include the thresholds, comparison methods, quality metric thresholds, or other predetermined/configuration values described above. The composite image processing configuration 1214 may store specific values for a given configuration. The composite image processing configuration 1214 may, in some implementations, store information for obtaining values for a given configuration element. For example, an auto-approve verdict threshold or prohibited word list may be specified as a network location (e.g., URL) in conjunction with username and password information to access the network location to obtain the auto-approve verdict threshold or prohibited word list.

The memory 1210 may also include or communicate with one or more auxiliary data stores, such as data store 1222. The data store 1222 may electronically store data regarding the composite images, extracted images, extraction comparisons for specific item types, authorization verdicts, and the like.

The elements included in the computing device 1200 may be coupled by a bus 1290. The bus 1290 may be a data bus, communication bus, or other bus mechanism to enable the various components of the computing device 1200 to exchange information.

In some embodiments, the computing device 1200 may include additional or fewer components than are shown in FIG. 12. For example, a computing device 1200 may include more than one processing unit 1202 and computer readable medium drive 1206. In another example, the computing device 1202 may not be coupled to a display 1218 or an input device 1220. In some embodiments, two or more computing devices 1200 may together form a computer system for executing features of the present disclosure.

The composite image processing features can be included to provide several non-limiting advantages that can significantly improve the automation of the quality assurance process and offer additional image services.

One example is unconditional automated image rejection. As discussed above, in some implementations, a vast majority of composite images are rejected by manual QA. Rather than expending the resources to store, route, and evaluate these images through a manual process, it may be possible to directly reject all composite images found using the features discussed above. This may lead to increased authorization automation and removes the subjectivity implicit in manual QA since the data store may include a history of image shapes.

Another example is conditional automated image rejection. The composite image system may be trained to accept or reject different clusters of composite images. For instance, using a manually trained dataset, a cluster can be marked with the verdict of the majority of the verdicts of its images. This relies on the assumption that if a few images for particular underlying images are poorly composed, it is likely that the rest will also be. This process can also be set up to choose not to make an automated decision if there is much disagreement in the labels for a cluster. Such conditional decisions could also be made relative to the identity of the uploader rather than by cluster so that if a particular uploader is historically poor at compositing images, all of the images detected as composited for that uploader will be rejected.

As yet another example, how images are presented via the QA workstation may be enhanced. Visual clustering of composite images included in a cluster may be provided for batch manual QA. For example, when images enter the system from an uploader, they are not necessarily ordered, such as by appearance or content. This can slow down manual QA because the batch processing QA system relies on similar images appearing together than can be accepted or rejected as a group. The composite image detection features can be used to reorder the images by grouping them based on shape to enable more effective batch QA processing.

A further non-limiting advantage of the composite image processing features is improved image classification. Image classification algorithms may be challenged by composite images because some part of the image may be good quality while the rest may be poor quality. By explicitly extracting out the graphics from the background images, these graphics can be passed back through the classification pipeline to classify the image more accurately.

The extraction features also allow for prurient image detection. Composite images sometimes consist of prurient images overlaid on shirts. These can be difficult to detect using a classifier because the shirt itself may have strong features that indicate the image should be accepted. However, extracting the images from the background enables the classifiers to focus on that region and better detect such issues.

Similarly, improper text can be detected more accurately. The features discussed can be used to accurately extract text that can be combined with OCR to detect improper text. Detecting text can also be used to supplement the item metadata such as title and description.

A further non-limiting advantage of the described features is improved image composition quality. Given that the underlying image (e.g., item) can be separated from the overlaid graphics, automated image analysis algorithms may be included to analyze the pixel region under the graphics to determine whether important information such as zippers or clothing folds are present. If so, a new image can be generated where the graphic does not overlap important information by modifying the graphic or moving it to a better location on the item.

The features may also be used to implement automated selection creation for sellers. Given the library of composite images automatically extracted and the resulting library of background images and overlaid graphics, new images with different combinations of items and overlays may be automatically generated for uploaders using images extracted from previously uploaded composite images. For example, if a user's composite images consist of X background images with Y graphics overlaid, the system could potentially generate X*Y images to represent all possible combinations of background images with graphics overlaid. For efficiency and extensibility, the system may be configured to store the underlying images and graphics as two separate layers and compose them dynamically such as in response to search requests. This can enable a growing selection as additional composite images are uploaded.

The features may provide advantages for users searching the catalog system. For example, the composite image processing may be used to provide automated suggestions for customers. Since the features automatically groups composite images into clusters, targeted "you may also like" suggestions for searches may be provided. Rather than basing such suggestions on the purchases of other customers, the composite image clustered suggestions could offer other items that have different graphics overlaid or different items with a similar graphic overlaid.

The features may also provide upload statistical information. For example, having composite image information stored in a data store makes it possible to gather statistics on composite image submissions on an uploader-basis. For example, the number of unique clusters divided by the total number of images indicates how often a user relies on compositing for generating item images. Such statistics could be used to generate feedback on image compositing, guidance for efficient batch uploading, authorization verdicts, or similar composite image processing feedback.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a composite image processing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A composite image processing device can be or include a microprocessor, but in the alternative, the composite image processing device can be or include a controller, microcontroller, or state machine, combinations of the same, or the like configured to receive and process image data. A composite image processing device can include electrical circuitry configured to process computer-executable instructions. Although described herein primarily with respect to digital technology, a composite image processing device may also include primarily analog components. For example, some or all of the composite image processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a composite image processing device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the composite image processing device such that the composite image processing device can read information from, and write information to, the storage medium. In the alternative, the storage medium can be integral to the composite image processing device. The composite image processing device and the storage medium can reside in an ASIC. The ASIC can reside in a user terminal. In the alternative, the composite image processing device vice and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A device comprising:
 a computer-readable memory storing specific computer-executable instructions; and
 a processor in communication with the computer-readable memory, wherein the processor executes the specific computer-executable instructions to cause the device to at least:
  receive a feature signature for a known composite image;
  receive a prior authorization determination for the known composite image, the prior authorization determination indicating that the known composite image may be transmitted in response to a search request received from another electronic device by a catalog system;
  receive an input image to be authorized for transmission via the catalog system, the input image comprising a background image region, an underlying image region, and an overlaid image region being overlaid upon at least a portion of the underlying image region;
  remove the background image region from the input image;
  generate an input image feature signature indicative of a shape of an item shown in the underlying image region;
  determine that the input image feature signature matches the feature signature; and
  upon determining that the input feature signature matches the feature signature, authorize the input image for transmission via the catalog system based at least in part on the prior authorization determination for the known composite image.

2. The device of claim 1, wherein the input image feature signature is generated from a segmented image, the segmented image comprising, for each pixel, one of a pixel-on value or a pixel-off value, and wherein the processor executes the specific computer-executable instructions to at least:
    divide the segmented image into sectors; and
    for each sector of the segmented image, generate a count of pixel-on values within the sector, wherein the input image feature signature includes a vector of elements, wherein each element corresponds to a sector and the value for the element corresponds to the count of pixel-on values within the sector.

3. The device of claim 2, wherein the processor executes the specific computer-executable instructions to divide the segmented image by causing the device to at least:
    identify a center point of the segmented image; and
    form a sector by extending two lines from the center point, the two lines separated by a predetermined angle.

4. The device of claim 1, wherein the processor executes the specific computer-executable instructions to further cause the device to at least:
    generate an indication of a color of the item shown in the underlying image region, wherein the input image feature signature includes a vector of elements, wherein an element corresponds to item color and the value for the element is the indication of the color of the item shown in the underlying image region.

5. The device of claim 4, wherein the processor executes the specific computer-executable instructions to further cause the device to generate the indication of the color of the item shown in the underlying image region by causing the device to at least:
    extract a contour around the underlying image region; and
    generate a color value for the underlying image region using color channel information for pixels within the contour, wherein the color value is used as the value for the element corresponding to the item color.

6. The device of claim 1,
    wherein the known composite image is included in a cluster of composite images;
    wherein the processor executes the specific computer-executable instructions to further cause the device to at least determine that a size of the cluster of composite images satisfies an auto-approve threshold; and
    wherein authorizing the input image is based at least in part on the prior authorization determination for the known composite image and determining that the size of the cluster of composite images satisfies the auto-approve threshold.

7. The device of claim 1, wherein the processor executes the specific computer-executable instructions to further cause the device to at least:
    identify a set of images in which each image of the set of images has a composite detection result including an identifier for the known composite image;
    transmit the set of images to an authorization server;
    receive an authorization determination for an image included in the set of images; and
    apply the authorization determination to at least one other image in the set of images.

8. The device of claim 1, wherein the processor further executes the specific computer-executable instructions to further cause the device to at least:
    identify a set of images in which each image of the set of images has a feature signature matches the feature signature for the known composite image; and
    generate a reconstructed underlying image using pixel color values from the set of images and the known composite image, wherein the reconstructed underlying image does not include a graphic overlay included in the overlaid image region.

9. The device of claim 8, wherein the processor further executes the specific computer-executable instructions to further cause the device to at least:
    generate, on a pixel-by-pixel basis, for each pixel location, a mode color value of pixels at a respective pixel location in the set of images,
    wherein the pixel color values include the mode color value of the pixels at the respective pixel location in the set of images.

10. The device of claim 8, wherein the processor further executes the specific computer-executable instructions to further cause the device to at least:
    extract the overlaid image region from the input image based at least in part on the reconstructed underlying image;
    identify, via an optical character recognition system, a word or phrase contained in the overlaid image region extracted from the input image; and
    determine that the word or phrase is not included in a list of prohibited words or phrases, wherein authorizing the input image is based at least in part on the prior authorization determination for the known composite image and determining that the word or phrase is not included in the list of prohibited words or phrases.

11. A computer-implemented method comprising:
    under control of a computing device executing specific computer-executable instructions,
        receiving a feature signature for a known composite image;
        receiving a prior authorization determination for the known composite image, the prior authorization determination indicating that the known composite image may be transmitted in response to a search request received from another electronic device by a catalog system;
        receiving an input image to be authorized for transmission via the catalog system, the input image comprising an overlaid image region, an underlying image region showing an item upon which the overlaid image region is placed, and a background image region;
        removing the background image region from the input image;
        generating an input image feature signature indicative of a shape of the item shown in the underlying image region;
        determining that the input image feature signature matches the feature signature; and
        upon determining that the input feature signature matches the feature signature, authorizing the input image for transmission via the catalog system based at least in part on the prior authorization determination for the known composite image.

12. The computer-implemented method of claim 11, further comprising:
    generating a segmented image, the segmented image comprising, for each pixel, one of a pixel-on value or a pixel-off value;
    dividing the segmented image into sectors; and
    for each sector of the segmented image, generating a count of pixel-on values within the sector, wherein the input image feature signature includes a vector of elements, wherein each element corresponds to a sector and the value for the element corresponds to the count of pixel-on values within the sector.

13. The computer-implemented method of claim 12, further comprising:
generating an indication of a color of the item shown in the underlying image region, wherein the input image feature signature includes a vector of elements, wherein an element corresponds to item color and the value for the element is the indication of the color of the item shown in the underlying image region.

14. The computer-implemented method of claim 13, wherein generating the indication of the color of the item shown in the underlying image region comprises:
extracting a contour around the underlying image region; and
generating a color value for the underlying image region using color channel information for pixels within the contour, wherein the color value is used as the value for the element corresponding to the item color.

15. The computer-implemented method of claim 13, further comprising:
identifying a hashing function for combining the indication of shape and the indication of color; and
applying the hashing function to combine the indication of shape and the indication of color to generate the feature signature.

16. The computer-implemented method of claim 11,
wherein the known composite image is included in a cluster of composite images;
wherein the computer-implemented method further comprises determining that a size of the cluster of composite images satisfies an auto-approve threshold; and
wherein authorizing the input image is based at least in part on the prior authorization determination for the known composite image and determining that the size of the cluster of composite images satisfies the auto-approve threshold.

17. The computer-implemented method of claim 11, further comprising:
identifying a set of images in which each image of the set of images has a composite detection result including an identifier for the known composite image;
transmitting the set of images to an authorization server;
receiving an authorization determination for an image included in the set of images; and
applying the authorization determination to at least one other image in the set of images.

18. The computer-implemented method of claim 11, further comprising:
identifying a set of images in which each image of the set of images has a feature signature matches the feature signature for the known composite image; and
generating a reconstructed underlying image using pixel color values from the set of images and the known composite image, wherein the reconstructed underlying image does not include a graphic overlay included in the overlaid image region.

19. The computer-implemented method of claim 18, further comprising:
extracting the overlaid image region from the input image based at least in part on the reconstructed underlying image;
identifying, via an optical character recognition system, a word or phrase contained in the overlaid image region extracted from the input image; and
determining that the word or phrase is not included in a list of prohibited words or phrases, wherein authorizing the input image is based at least in part on the prior authorization determination for the known composite image and determining that the word or phrase is not included in the list of prohibited words or phrases.

20. The computer-implemented method of claim 11, further comprising determining that a first number of pixels included in the input image corresponds to a second number of pixels included in the known composite image, wherein authorizing the input image is based at least in part on the prior authorization determination for the known composite image and determining that the first number of pixels included in the input image corresponds to the second number of pixels included in the known composite image.

* * * * *